(12) United States Patent
Kelly et al.

(10) Patent No.: US 8,358,561 B2
(45) Date of Patent: Jan. 22, 2013

(54) BAYESIAN DHI FOR SEISMIC DATA (75) Inventors: Michael Carl Kelly, Plano, TX (US);
Nima Riahi, Zürich (CH); Martine Ruiz, Penthalaz (CH); Weiwei, Zurich (CH)

(73) Assignee: Spectraseis AG, Zurich (CH)

( * ) Notice: Subject to any disclaimer, the term of this patent is extended or adjusted under 35 U.S.C. 154(b) by 282 days.

(21) Appl. No.: 12/758,875

(22) Filed: Apr. 13, 2010

(65) Prior Publication Data
US 2011/0292764 A1 Dec. 1, 2011

(51) Int. Cl.
*G01V 1/00* (2006.01)
(52) U.S. Cl. .............. 367/38; 367/73; 702/14
(58) Field of Classification Search .............. 367/38, 367/73; 702/14, 16
See application file for complete search history.

(56) References Cited

U.S. PATENT DOCUMENTS

| 2011/0010143 A1* | 1/2011 | Dai et al. .............. 703/2 |
| 2011/0172977 A1* | 7/2011 | Kolbjornsen et al. .............. 703/2 |
| 2011/0255371 A1* | 10/2011 | Jing et al. .............. 367/73 |
| 2011/0264430 A1* | 10/2011 | Tapscott et al. .............. 703/10 |
| 2012/0080197 A1* | 4/2012 | Dickens et al. .............. 166/369 |

* cited by examiner

*Primary Examiner* — Mark Hellner (57) ABSTRACT

A method of locating subsurface hydrocarbon reservoirs includes acquiring seismic data, extracting seismic data attributes from the seismic data, calculating exemplar data group probability density function values using distribution values associated with the seismic attributes and applying Bayesian inversion to determine the likelihood of subsurface hydrocarbons.

13 Claims, 7 Drawing Sheets

BAYESIAN DHI FOR SEISMIC DATA

BACKGROUND OF THE DISCLOSURE

1. Technical Field

The disclosure is related to seismic exploration for oil and gas, and more particularly to processing seismic data.

2. Description of the Related Art

Seismic exploration for hydrocarbons is conducted using a source of seismic energy and receiving and recording the energy generated by the source using seismic detectors. On land, the seismic energy source may be an explosive charge or another energy source having the capacity to impart impacts or mechanical vibrations at or near the earth's surface. Seismic waves generated by these sources travel into the earth's subsurface and are reflected back from strata boundaries and reach the surface of the earth at varying intervals of time depending on the distance traveled and the characteristics of the subsurface material traversed. The return waves are detected by the sensors and representations of the seismic waves as representative electrical signals are recorded for processing into images.

Normally, signals from sensors located at varying distances from the source are added together during processing to produce "stacked" seismic traces. In marine seismic surveys, the source of seismic energy is typically air guns. Marine seismic surveys typically employ a plurality of sources and/or a plurality of streamer cables, in which seismic sensors are mounted, to gather three dimensional data.

The process of exploring for and exploiting subsurface hydrocarbon reservoirs is often costly and inefficient because operators have imperfect information from geophysical and geological characteristics about reservoir locations. Furthermore, a reservoir's characteristics may change as it is produced.

Geophysical and geological methods are used to determine well locations. Expensive exploration investment is often focused in the most promising areas using relatively slow methods, such as reflection seismic data acquisition and processing. The acquired data are used for mapping potential hydrocarbon-bearing areas within a survey area to optimize exploratory well locations and to minimize costly non-productive wells.

The time from mineral discovery to production may be shortened if the total time required to evaluate and explore a survey area can be reduced by applying selected methods alone or in combination with other geophysical methods. Some methods may be used as a standalone decision tool for oil and gas development decisions when no other data is available.

Geophysical and geological methods are used to maximize production after reservoir discovery as well. Reservoirs are analyzed using time lapse surveys (i.e. repeat applications of geophysical methods over time) to understand reservoir changes during production.

Data acquisition for oil exploration may have a negative impact on the environment. The impact of oil exploration methods on the environment may be reduced by using low-impact methods and/or by narrowing the scope of methods requiring an active source, including reflection seismic and electromagnetic surveying methods.

Various geophysical data acquisition methods have a relatively low impact on field survey areas. Low-impact methods include gravity and magnetic surveys that maybe used to enrich or corroborate structural images and/or integrate with other geophysical data, such as reflection seismic data, to delineate hydrocarbon-bearing zones within promising formations and clarify ambiguities in lower quality data, e.g. where geological or near-surface conditions reduce the effectiveness of reflection seismic methods.

SUMMARY

A method of locating subsurface hydrocarbon reservoirs includes acquiring seismic data associated with a plurality of seismic data sensor locations, selecting a hydrocarbon associated exemplar data group and a non-hydrocarbon associated exemplar data group from the seismic data associated with a plurality of data sensor locations to obtain hydrocarbon exemplar group members and non-hydrocarbon exemplar group members, calculating hydrocarbon exemplar data group probability density function values, using a processor, and non-hydrocarbon exemplar data group probability density function values over an attribute space based on selected distribution values of seismic data attributes of the hydrocarbon exemplar group members and non-hydrocarbon exemplar group members and applying a Bayesian inversion to determine exemplar data group membership probability for seismic data associated with at least one of the plurality of seismic data sensor locations by comparing distribution values of the seismic attribute values of the seismic data associated with at least one of the plurality of seismic data sensor locations to at least one of the calculated hydrocarbon exemplar data group probability density function values and non-hydrocarbon exemplar data group probability density function values.

Embodiments of a two-attribute (or more) Bayesian DHI process based on at least two distribution statistics of the empirically observed hydrocarbon microtremor are disclosed. The process utilizes median, standard deviation, stability and other statistical measures of the distribution in time of low-frequency spectral attributes or other selected attributes derived from seismic data. The distribution median offers a more robust energy measure compared to other techniques that estimate energy based on one large time period. The process gives quantitative HC probability maps that are easy to interpret and can be used for reservoir monitoring or risk analysis.

DETAILED DESCRIPTION

Information to directly detect hydrocarbon reservoirs may be extracted from naturally occurring seismic waves and vibrations measured at the earth's surface. These naturally occurring waves may be measured using seismic data acquisition methods that record ambient or "passive" data. Statistical measures derived from attributes extracted from the seismic data are used to determine the likelihood of the presence of hydrocarbons.

Passive or ambient seismic data acquisition methods rely on seismic energy from sources not directly associated with the data acquisition. In this seismic monitoring there may be no actively controlled and triggered seismic source. It will be appreciated of course that traditional active seismic sources may be recorded during data acquisition and even used advantageously. Examples of sources recorded with ambient or passive seismic acquisition are microseisms (e.g., rhythmically and persistently recurring low-energy earth tremors), microtremors and other ambient or localized seismic energy sources.

Microtremors are attributed to the background energy present in the earth that may be due to many different sources. Microtremor seismic energy may include sustained seismic signals within a limited frequency range. Microtremor signals, like all seismic waves, contain information affecting spectral signature characteristics due to the media or environment that the seismic waves traverse. These naturally occurring relatively low frequency background seismic waves (sometimes termed noise or hum) of the earth may be generated from a variety of sources, some of which may be indeterminate.

Processing survey results demonstrates that direct hydrocarbon indicators (DHI) may be extracted using spectral analysis of microtremors from passive (without a controlled source) or active (with a controlled source) seismic acquisition. Microtremor analysis provides a method for identification and mapping of fluid reservoirs or reservoir related parameters directly from data acquired in land and marine areas using seismic data, which may be naturally occurring seismic background waves. Collected over time these data highlight changes in reservoir parameters.

Microtremor analysis allows for direct determination of a hydrocarbon reservoir independent of the reservoir structure. Additionally, the thickness of strata associated with a hydrocarbon reservoir may sometimes be determined or inferred from microtremor analysis or microtremor analysis combined with other geological or geophysical data.

One or more sensors are used to measure vertical and horizontal components of motion due to background seismic waves at multiple locations within a survey area. These components may be measured separately or in combination and may be recorded as signals representing displacement, velocity, and/or acceleration. In data these measurements may be recorded as particle displacement values, particle velocity values, particle acceleration values or particle pressure values.

Local conditions for a geophysical survey may affect a method's results. In many cases a spectral ratio method (e.g., the ratio of the Vertical component to one or both Horizontal components) provides a reliable direct hydrocarbon indicator; in other cases a skilled operator can use the results to improve their interpretation of other geological and geophysical data and generate an improved subsurface model allowing for more efficient exploration and production decisions.

The sensor equipment for measuring seismic waves may be any type of seismometer. Seismometer equipment having a large dynamic range and enhanced sensitivity compared with other transducers may provide the best results (e.g., multi-component earthquake seismometers). A number of commercially available sensors utilizing different technologies may be used, e.g. a balanced force feed-back instrument or an electrochemical sensor. An instrument with high sensitivity at very low frequencies and good coupling with the earth enhances the efficacy of the method.

Ambient noise conditions representative of seismic waves that may have not traversed subsurface reservoirs can negatively affect the recorded data. Techniques for removing unwanted artifacts and artificial signals from the data, such as cultural and industrial noise, are important for applying this method successfully in areas where ambient noise is high.

While data may be acquired with multi-component earthquake seismometer equipment with large dynamic range and enhanced sensitivity, many different types of sensor instruments can be used with different underlying technologies and varying sensitivities. Sensor positioning during recording may vary, e.g. sensors may be positioned on the ground, below the surface or in a borehole. The sensor may be positioned on a tripod or rock pad. Sensors may be enclosed in a protective housing for ocean bottom placement. Wherever sensors are positioned, good coupling results in better data. Recording time may vary, e.g. from minutes to hours or days. In general terms, longer-term measurements may be helpful in areas where there is high ambient noise and provide extended periods of data with fewer noise problems.

The layout of a survey may be varied, e.g. measurement locations may be close together or spaced widely apart and different locations may be occupied for acquiring measurements consecutively or simultaneously. Simultaneous recording of a plurality of locations may provide for relative consistency in environmental conditions that may be helpful in ameliorating problematic or localized ambient noise not related to subsurface characteristics.

A plurality of attributes may be extracted or generated from low frequency spectra, each of which captures certain aspects of the underlying data. A number of extracted attributes have been found to at least qualitatively correlate with subsurface hydrocarbon accumulations or other petrophysical parameters of the subsurface. One of many objectives is to obtain quantitative predictions, for fluid and reservoir properties, using low frequency spectra data.

Low frequency spectra may be complex, with influences due to ocean waves, surface waves and body waves from various sources that may be indeterminate, subsurface hydrocarbon accumulations, anthropogenic noise and more. Condensing the information content of the spectra, into a small group of attribute values, that primarily contains information related to the hydrocarbon micro-tremors or other subsurface petrophysical parameters, may be problematic. The relationships between low frequency attributes and the corresponding reservoir and fluid properties are likely non-linear. A plurality of attributes used in combination with available geological and geophysical information may be used for mapping fluid and reservoir properties, or other subsurface parameters.

Using a large group of objectively measured, traditional seismic attributes, to make predictions of important reservoir and fluid properties is both a common and successful process. "Traditional seismic attributes" refers to attributes associated with data acquired with traditional controlled sources (explosives, airguns or vibrator sources) and recorded in the traditional frequency range of around 8 hertz to more than 100 hertz. Seismic attributes, have a complicated, often times unknown, and non-linear relationship with the reservoir and fluid properties. These attributes are routinely used as a group, to predict reservoir and fluid properties. Successful predictions are routinely made using both commercial and proprietary training/prediction packages. Predictions may be made, using seismic data attributes for the following non-exhaustive list of reservoir parameters: $S_{pay}$; Porosity; Permeability, Net pay thickness; $S_{pay}$*Porosity; $S_{pay}$*Net pay thickness; Porosity*Net pay thickness; $S_{pay}$*Porosity*Net pay thickness.

Presented here are embodiments for producing a Bayesian DHI using Low Frequency Seismic (LFS) data. In one embodiment two LFS attributes are used to classify and determine the likelihood of hydrocarbon existence in the subsurface. In another embodiment the attributes or selected distribution values of the seismic attributes are inverted to obtain reservoir parameters such as saturation, porosity, permeability and net thickness. Selected distribution values, which in themselves are seismic attributes, are derived from the statistical characteristics of seismic attributes. These include the mean, median, mode, standard deviation and 'stability,' which is defined as the median scaled by the inverse of the twice the standard deviation. The statistical attributes used for example in this disclosure are based on strength and variability of the empirically observed hydrocarbon tremor. Various embodiments for improved, more robust tremor energy measures and processing based on the temporal characteristic of the signal are disclosed herein. Bayesian classification is used both to accommodate uncertainties in the data as well as to provide a risk estimate.

These processes have been tested in several oil-field areas with known surface projections of oil-water contacts (OWC). Prediction results correlate well with reservoir locations. The embodiments disclosed provide a robust method for producing a DHI with estimates of uncertainty using LFS data.

Seismic data acquired with broadband seismometers over hydrocarbon-bearing structures have been observed to exhibit spectral anomalies in the frequency range of about 1 to 6 Hz, sometimes most notably in the vertical displacement. These anomalies have been found in association with hydrocarbons. One of several theories for a hydrocarbon microtremor generating mechanism is that the anomaly is a microtremor associated with the presence of a multiphase fluid such as brine and hydrocarbons. The tremor appears visible as redirected spectral energy over the seismic background.

The microtremor strength can be shown to be indicative of hydrocarbon (HC) presence in the subsurface. After preselecting data in time, the tremor energy calculated over the remaining time intervals in the frequency domain may be used as a low frequency (LF) attribute plotted on a map or in profile. Anomalous attribute values indicate increased HC potential. It is important to note that anthropogenic noise may cause interferences in the recorded data that require a careful pre-selection of the time intervals over which the recording is analyzed. Even when using minimally noise-affected data, the LFS attributes may exhibit variability rendering the resulting maps difficult to interpret.

Empirical evidence and forward modeling experiments indicate that microtremor variability in itself may be indicative of HC presence. Various embodiments of the DHI process presented here use a plurality of attributes, for example distribution-based attributes such as tremor strength and variability. These attributes are based on the tremor energy distribution in time. The distribution-based attributes appear more robust and reliable compared with some previously used HC potential attributes.

Exemplar receivers for two groups, hydrocarbon (HC) and no-hydrocarbon (NHC) are chosen based on the characteristics of their microtremor signature described below. Using two or more attributes groups as reference or input, a Bayesian HC probability is then computed for each receiver from the LF attributes. The resulting probability maps can be readily used for risk assessment. Furthermore, they are also more accurate when compared to a conventional single-attribute, deterministic classification process.

Figure 1:
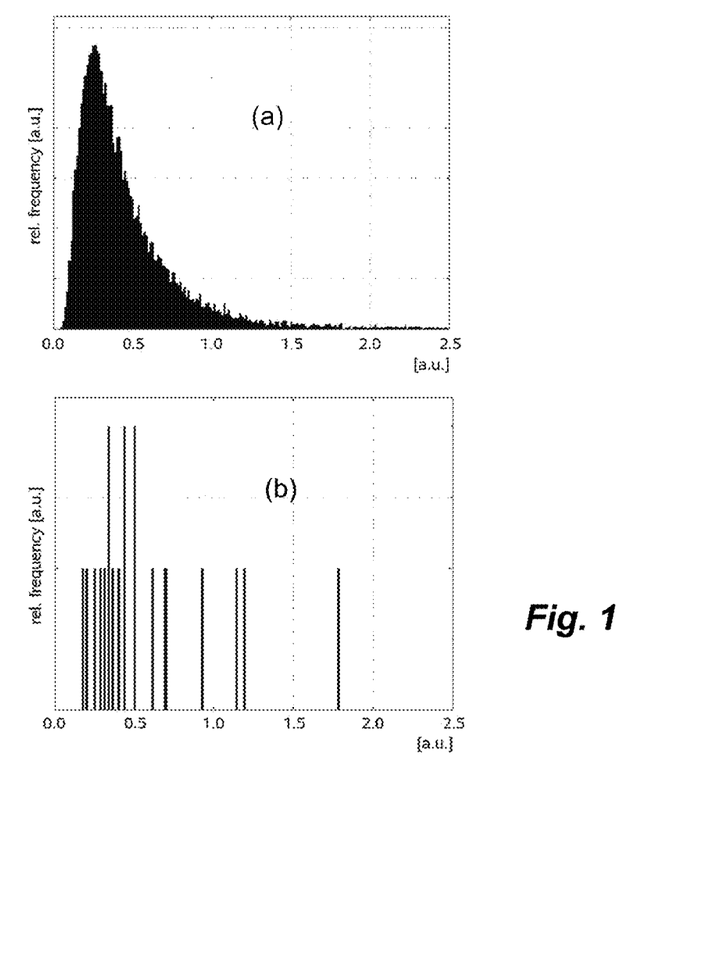
FIG. 1 is an illustration of a distribution of spectral energy in the frequency range 1-4 Hz of a 100-hour broadband recording (a) using an estimation window size of 40 seconds and (b) 3 hours.

Tremor energy may be calculated by selecting a time window in a recording, computing its power spectral density (PSD), and then integrating it over a frequency range of interest. The time evolution of this energy may be systematically studied on passive LF receivers both above and away from subsurface hydrocarbon bearing structures. FIG. 1 shows the distribution in time of the energy for a receiver with 20 hours of quiet recording time for an arbitrary seismic sensor. Energy sampling window sizes are used here as examples: 100 hours of recording with 40 seconds sample processing window (FIG. 1a) and a 3 hour sample processing window (FIG. 1b). The underlying distribution is lognormal with characteristics largely invariant to the sample window size. The overall characteristics of the distributions are very similar for both sampling window lengths. Vertical axis is relative frequency in arbitrary units; horizontal axis represents energy in arbitrary units.

At least part of the variability of previous tremor energy maps, for example PSD-IZ derived maps, may be due to chance or quasi-random errors brought about by using just one large window on a non-stationary ambient background signal. Note that many of the 3 hour samples in FIG. 1b would have overestimated the likely tremor energy. The tremor energy may be sampled with small or relatively small time windows to resolve its distribution characteristics. The median m of the distribution is then used as a robust energy measure. Also, the sample standard deviation $\sigma$ can be calculated as a measure of tremor variability during the considered time windows.

Figure 2:
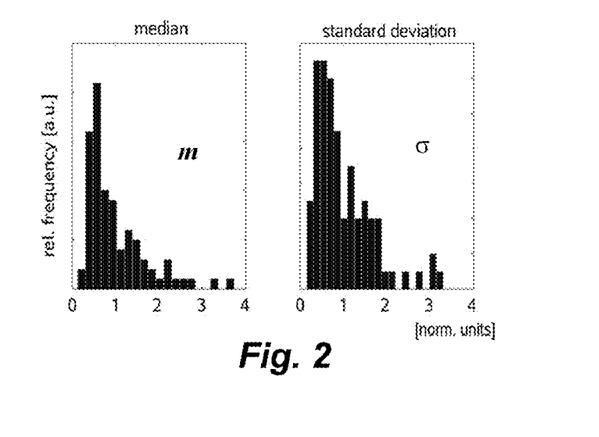
FIG. 2 is an illustration of a distribution of a tremor median m (left) and standard deviation $\sigma$ (right) over a seismic data acquisition area (normalized values used)

HC discrimination in m–$\sigma$ space: FIG. 2 shows histograms of LFS energy median m and standard deviation $\sigma$ from 87 receivers from a field in West Texas (carbonate oil reservoir at a depth of ~2100 m). These spatial distributions are both also of lognormal nature, an observation supported by other observations over a substantial number of other fields. Vertical axis is relative frequency in arbitrary units; horizontal axis units are normalized.

Figure 3:
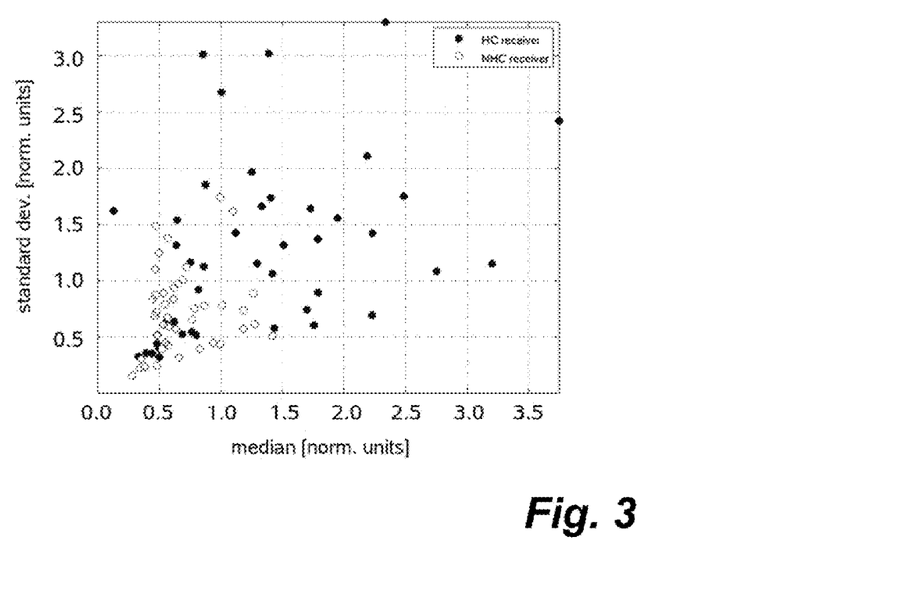
FIG. 3 is an illustration of a microtremor energy distribution median m and standard deviation $\sigma$ for 87 receivers plotted against each other. Filled circles represent receivers above hydrocarbon bearing structures, open circles represent receivers away from these structures.

In FIG. 3, the 87 values for m and $\sigma$ are plotted against each other. Each axis is scaled so that the mean of its values equals 1. The known surface projection of the OWC was used to mark the circles as HC (filled circle) or no HC (open circles). Note that the OWC information in FIG. 3 is not part of the process but merely used to motivate the use of the m–$\sigma$ space for HC discrimination. It is apparent that in this space the receivers separate into two groups, based on whether the recording was made over hydrocarbons or not. The two groups separate reasonably well.

The separation is, however, not perfect. Most likely causes include: 1) Noise sources near a receiver which alter its LF energy. Windowing, or trace muting, cannot entirely exclude this, 2) Site effects on the LF wave field caused by the overburden or near surface effects, 3) Interference among tremors from distributed HC patches in the subsurface and between surface noises. Furthermore, the HC tremor characteristics are likely to vary depending on fluid type and reservoir properties.

Figure 4:
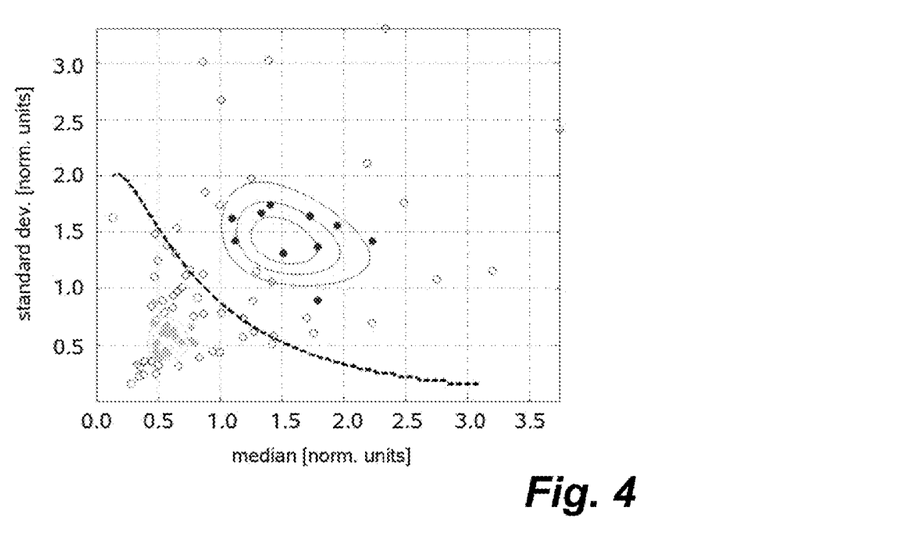
FIG. 4 is an illustration of the m–$\sigma$ space in FIG. 3 with groups of receivers interpreted as HC (solid black circles) and NHC (solid grey circles)

The above mentioned uncertainties in the data make an empirical Bayesian methodology a natural choice for data classification. First, its outputs are probabilities—a prerequisite for uncertainty-aware risk analysis. Second, its empirical element allows an interpreter to include prior information into the prediction process. This information can be, e.g. log data from nearby wells, or partially known reservoir data (exploitation). FIG. 4 illustrates the m–σ space already shown in FIG. 3. Based on observed tremor signature two groups of receivers were marked by an interpreter as HC (solid black circles) and NHC (solid grey circles). The contours represent the bivariate lognormal exemplar distributions estimated from the marked HC/NHC receivers. The dashed line indicates the locus of equal probability of HC/NHC (decision boundary). The process may be used or tested in a blind fashion as it was for the dataset used in several embodiments disclosed herein, i.e. only tremor attributes derived from the seismic data with no prior information was considered for selecting exemplar receivers.

To calculate hydrocarbon probabilities using the Bayesian methodology, so-called class-conditional probability density functions (pdf's), or exemplar pdf's, are required. These exemplar distributions may be estimated using selected exemplar data groups. Since both strength and variability are seen to be roughly lognormally distributed (FIG. 2), a parametric bivariate lognormal model may be selected for the exemplar pdf's. Model parameters may be calculated from the (m, σ) values of the exemplar receivers by use of Maximum Likelihood estimation. Other models might, however, be used as well. The contour lines in FIG. 4 indicate the lognormal hydrocarbon (HC) and no-hydrocarbon (NHC) exemplar pdf's based on the marked data points.

A useful feature of the Bayes approach is the concept of prior probabilities. For an HC classification this means that assumed general prospectivity can readily be built into the analysis. In a blind case (such as in several embodiments disclosed here) a so called uninformative prior probability distribution is used for all receivers: P(HC)=P(NHC)=0.5.

The HC/no-HC exemplar pdf values at the ("m",σ) values of a receiver will then yield an HC probability for the receiver location. This is done for the dataset illustrated in FIG. 4 and the resulting HC probability map is discussed in the next section.

Figure 5:
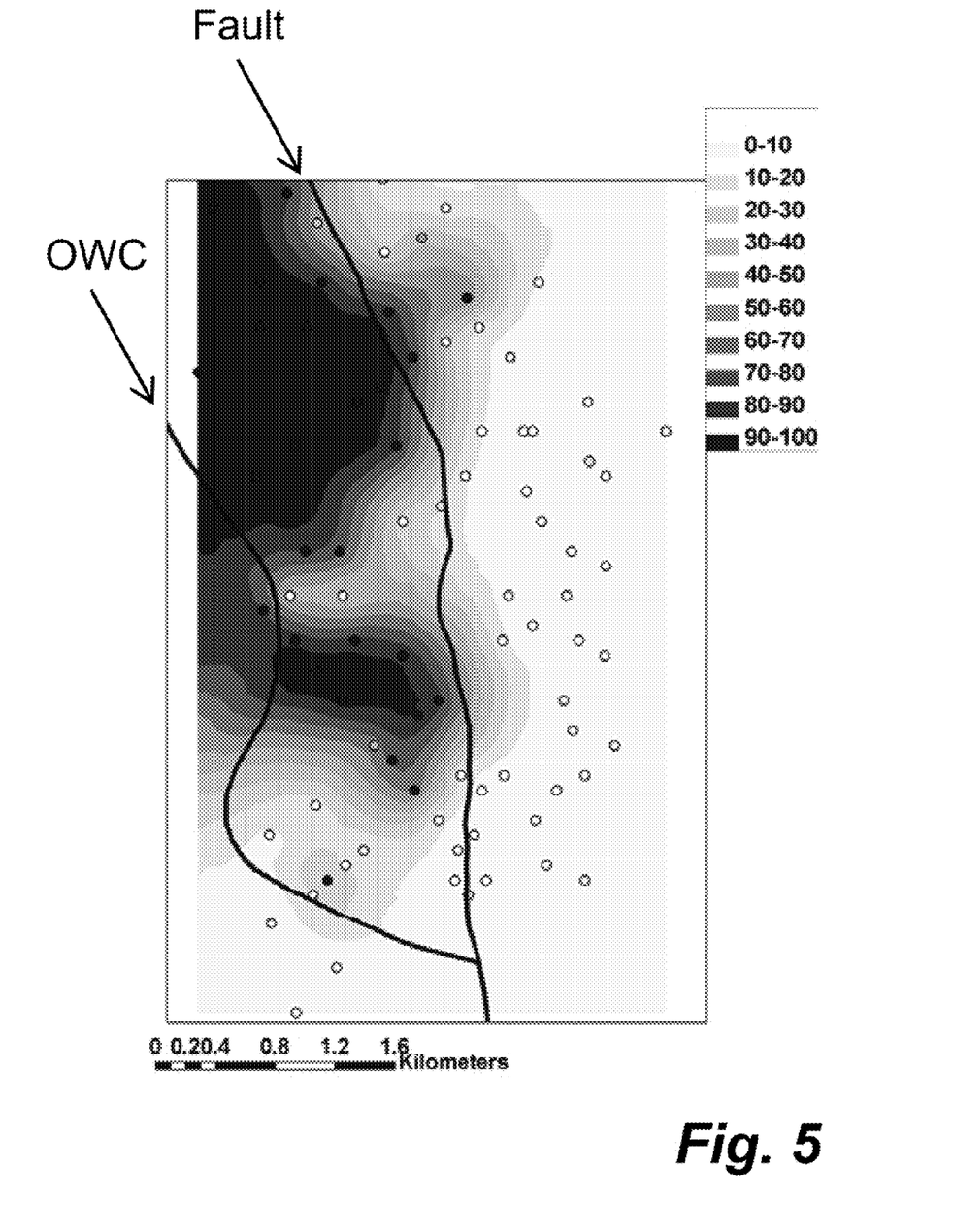
FIG. 5 is an illustration of a hydrocarbon probability map (%) according to an embodiment of the present disclosure.

FIG. 5 shows the kriged HC probability map computed for the shown field using one of the embodiments disclosed. The black contour line represents the oil-water contact (OWC) boundary as indicated by the arrow. The eastern part of the field is sealed off from the reservoir by a fault and is non-prospective—a feature that was well represented by the prediction process. Hydrocarbons are accumulated in two anticlines to the north and south of the narrow neck of the OWC. The process mapped the northern part well but failed to recognize the southern part. Possible reasons for this include: site effects, destructive tremor interference due to spatial distribution of HC patches, or change in reservoir properties affecting the tremor generation mechanism.

The process has been "blindly" tested in the vicinity of four hydrocarbon reservoirs. All receivers with a HC probability of P(HC)>0.5 are considered HC predictions. Knowledge about surface projected HC locations was used after initial predictions to capture the accuracy of the predictions using these measures:

HC prediction accuracy $A_{HC}=\eta_{HC}/N_{HC}$,

NHC prediction accuracy $A_{NHC}=\eta_{NHC}/N_{NHC}$, where $\eta_{HC}$ and $\eta_{NHC}$ are the numbers of correct HC/no-HC predictions and $N_{HC}$ and $N_{NHC}$ are the numbers of receivers actually above/away from HC. Table 1 shows those accuracies for the four fields. Because the performance was established on a relatively small number of locations per field, the significance of the results must be verified. Therefore, accuracies were computed above which the predictor can be assumed to be non-random with a confidence of >90%. These lower accuracy thresholds are given in Table 1 as well. If a process has accuracies greater than these thresholds it can be considered significantly non-random. The Bayes HC and no-HC classifications in fact are greater than these thresholds in most of the cases and so the process is non-random.

The accuracies of the classification process were compared against accuracies from a deterministic classification that uses natural breaks (using Jenks optimization) in the median values only. Inspection of Table 1 shows that the two-attribute Bayes predictor outperforms the one-attribute predictor in most cases, especially for HC predictions. The process can thus be considered superior to deterministic one-attribute predictors.

TABLE 1

| | #HC rec. | #NHC rec. | $A_{HC}$ Jenks | $A_{NHC}$ Jenks | $A_{HC}$ Bayes | $A_{NHC}$ Bayes | Min $A_{HC}$ random | Min $A_{NHC}$ random |
|---|---|---|---|---|---|---|---|---|
| Field 1 (shown) | 43 | 44 | 56% | 80% | 70% | 91% | 56% | 57% |
| Field 2 | 24 | 9 | 67% | 100% | 63% | 89% | 58% | 67% |
| Field 3 | 9 | 22 | 67% | 73% | 100% | 77% | 67% | 59% |
| Field 4 | 14 | 14 | 29% | 71% | 64% | 79% | 64% | 64% |

Figure 6:
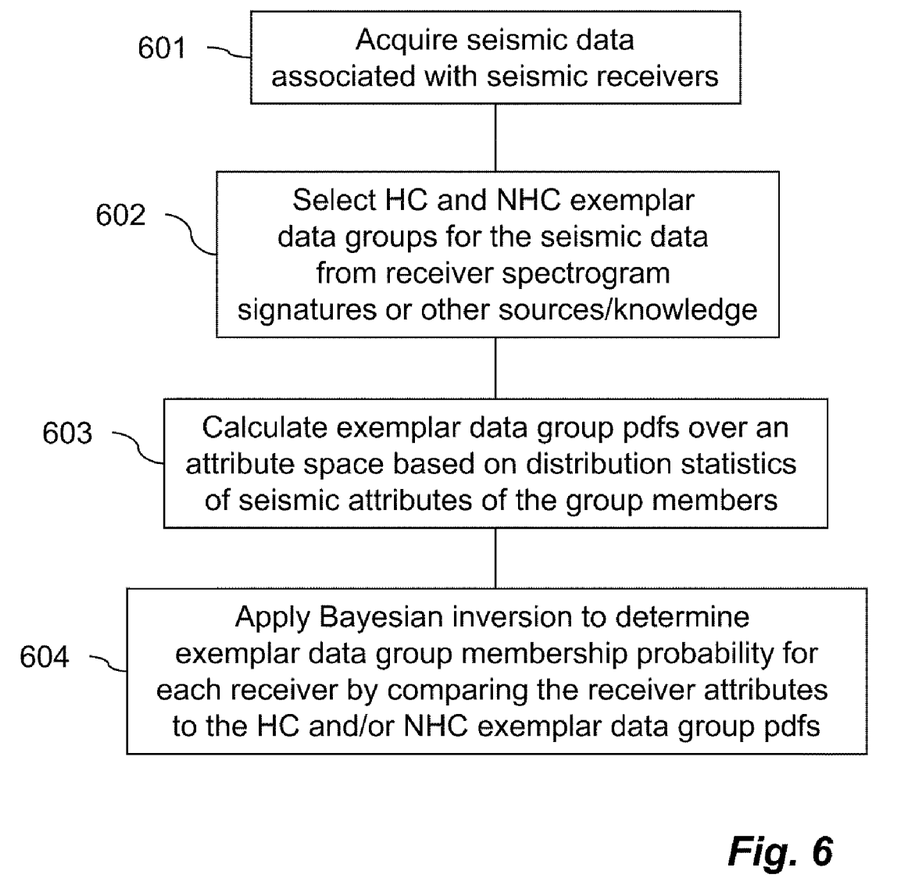
FIG. 6 illustrates a flow chart related to a to an embodiment of the present disclosure for direct subsurface hydrocarbon reservoir detection.

As illustrated in FIG. 6, calculating a DHI or HC probability comprises acquiring or selecting seismic data 601 associated with seismic sensors, which may be "low-frequency" seismic data in the 1-6 Hertz range, though other frequency ranges may be used. For example in FIG. 1, the 1-4 Hertz range is used. Each sensor is associated with a sensor position, usually in proximity to the earth surface or inside the earth, for example a borehole. Data processing contemporaneous with data selection may include noise removal, data conditioning and filtering or other processing. Exemplar HC and NHC data groups are selected 602 by an interpreter based on signatures visible in the receiver spectrogram or based on other (e.g. a priori) knowledge or data source, or statistical characteristics of the data. Exemplar pdfs in the two or more dimensional attribute space (of values) are estimated from the selected exemplar data groups. Model parameters of these exemplar pdfs may be calculated from the attribute values, such as selected distribution statistics or values, of the exemplar receivers, the receiver attributes (e.g., statistical distribution values), by use of Maximum Likelihood estimation. The actual pdfs are then evaluated using these model parameters. So, exemplar data group pdfs are calculated 603 over the attribute space based on attributes of the group members. For example, seismic attributes may be derived from receiver spectrograms. Examples of seismic attributes include power spectral density functions of the seismic data, ratios of the data components (such as vertical to horizontal ratios), polarization values or characteristics, etc. The hydrocarbon probability value associated with a receiver location is then determined by evaluating the exemplar pdfs at the attribute values of the receivers. Bayesian inversion is applied to determine 604 exemplar data group membership probability for each receiver by comparing the receiver attributes to the HC and/or NHC exemplar data group pdfs.

Figure 7:
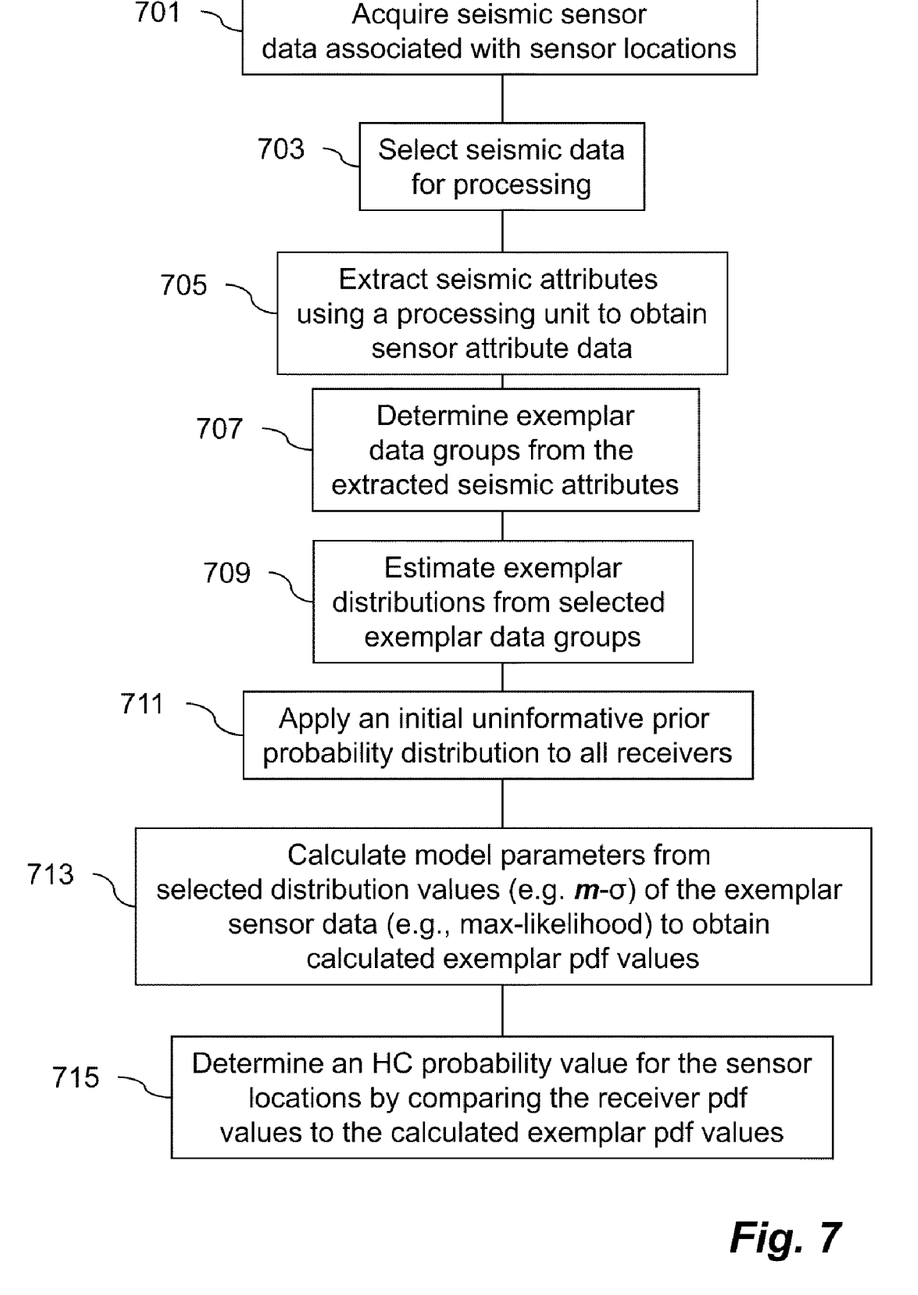
FIG. 7 illustrates a flow chart related to a to an embodiment of the present disclosure for direct subsurface hydrocarbon reservoir detection.

As illustrated in FIG. 7, calculating a DHI or HC probability comprises acquiring seismic data 701, which may be "low-frequency" seismic data in the 1-6 Hertz range, though other frequency ranges may be used. Data are selected for processing 703. Processing may include noise removal, data conditioning and filtering or other conditioning. Seismic data attributes are extracted 705 from the data associated with sensor locations using a processing unit (for example 11 in FIG. 9). These extracted seismic data attributes may be statistical distribution values of derived from other seismic attributes of the acquired data. Exemplar data groups are determined using seismic data features, as considered by a skilled interpreter 707. Also, exemplar groups may be determined using associated geological and geophysical information, such as known hydrocarbon production. All or most sensor data may initially be assigned an "uninformative prior probability distribution" 711. For example: P(HC)=P(NHC)=0.5. Model parameters may be calculated 713 from attribute values of the exemplar receivers by use of Maximum Likelihood estimation. Chosen values of the exemplar receivers include statistical distribution measures, such as median and standard deviation or other statistics of LF microtremor energy. The hydrocarbon probability for a receiver location not included in the exemplar groups is then determined 715 by comparing the exemplar probability densities at the receiver attribute values. The hydrocarbon probability values, as well as the attribute values, may then be stored or displayed.

Figure 8:
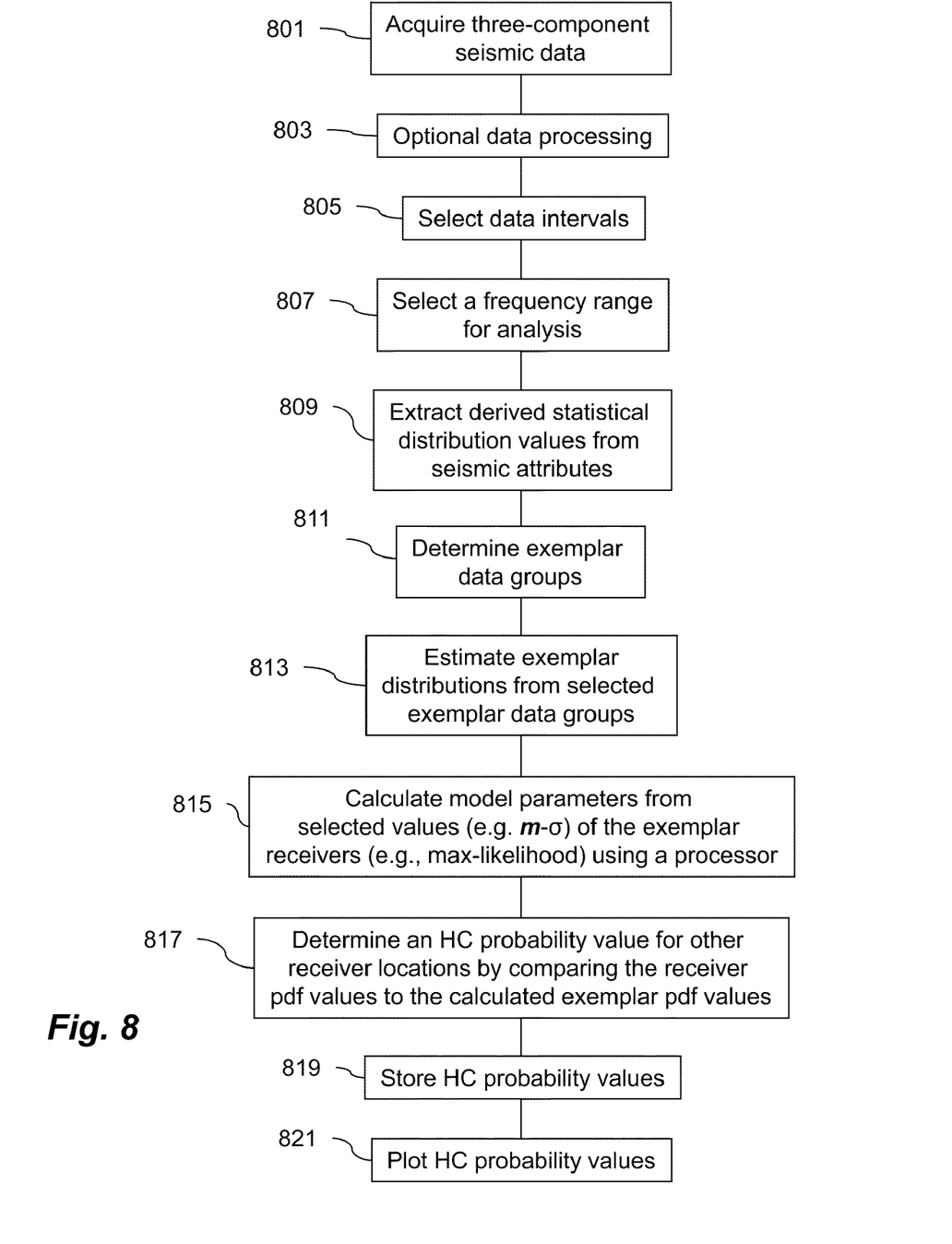
FIG. 8 illustrates a flow chart related to a method for seismic data processing according to an embodiment of the present disclosure for determining hydrocarbon probability values related to subsurface hydrocarbon reservoir detection using seismic data.

As illustrated in FIG. 8, calculating a DHI or HC probability comprises acquiring three-component seismic data 801. Data are selected for various optional processing steps 803, for example any seismic data processing/conditioning methods as known in the seismic arts. Processing may include noise removal, data conditioning, muting and filtering. Data time intervals 805 or frequency intervals may be selected 807. Seismic data attributes are extracted 809 from the data. Exemplar data groups are determined by an interpreter based on signatures visible in the receiver spectrogram or other data source 811. All or most receivers may initially be assigned an uninformative prior probability distribution. For example: P(HC)=P(NHC)=0.5. Model parameters may be calculated 815 from attribute values of the exemplar receivers using a processing unit (for example 11 in FIG. 9), for example by use of Maximum Likelihood estimation. Chosen values of the exemplar receivers include median and standard deviation or other statistics of the microtremor energy. The hydrocarbon probability for a receiver location is then determined 817 by comparing the exemplar probability densities evaluated at receiver attribute values. The hydrocarbon probability values, as well as the attribute values, may then be stored 819 or displayed 821.

In one nonlimiting embodiment a method for determining a direct hydrocarbon indicator from seismic data comprises acquiring seismic data associated with a plurality of seismic data sensor locations, selecting a hydrocarbon associated exemplar data group and a non-hydrocarbon associated exemplar data group from the seismic data associated with a plurality of data sensor locations to obtain hydrocarbon exemplar group members and non-hydrocarbon exemplar group members, calculating hydrocarbon exemplar data group probability density function values, using a processor, and non-hydrocarbon exemplar data group probability density function values over an attribute space based on selected distribution values of seismic data attributes of the hydrocarbon exemplar group members and non-hydrocarbon exemplar group members and applying a Bayesian inversion to determine exemplar data group membership probability for seismic data associated with at least one of the plurality of seismic data sensor locations by comparing distribution values of the seismic attribute values of the seismic data associated with at least one of the plurality of seismic data sensor locations to at least one of the calculated hydrocarbon exemplar data group probability density function values and non-hydrocarbon exemplar data group probability density function values.

Another aspect includes calculating calculating parametric models from selected distribution values of hydrocarbon exemplar group members and non-hydrocarbon exemplar group members. In another aspect, the selected distribution values of the seismic attributes are selected from the group consisting of i) mean, ii) mode, iii) median, iv) standard deviation and v) stability. Stability is the median divided by twice the standard deviation. In yet another aspect, the selected seismic data attributes of the hydrocarbon exemplar group members are i) tremor strength and ii) tremor variability. Tremor strength is the median of a seismic attribute and the standard deviation is a measure of tremor variability. In another aspect the selected seismic data attributes of the hydrocarbon exemplar group members are statistical distribution values derived from at least one selected from the group consisting of i) spectral density value, ii) ratio of vertical particle motion component to horizontal particle motion component, iii) vertical particle motion and iv) seismic data polarization value. In still another aspect the method includes displaying the exemplar data group membership probability for seismic data associated with at least one of the plurality of seismic data sensor locations. In yet another aspect the hydrocarbon associated exemplar data group is associated with produced hydrocarbon. Still another aspect includes classifying the seismic sensor attribute data as one selected from the list consisting of i) no-hydrocarbon or ii) hydrocarbon. In another aspect the seismic sensor data are at least one selected from the group consisting of i) particle velocity values, ii) particle acceleration values and iii) particle pressure values.

In another non-limiting embodiment a set of application program interfaces is embodied on a computer readable medium for execution on a processor in conjunction with an application program for determining a direct hydrocarbon indicator from seismic data, which comprises a first interface for receiving a hydrocarbon associated exemplar data group and a non-hydrocarbon associated exemplar data group from seismic data associated with a plurality of data sensor locations to obtain hydrocarbon exemplar group members and non-hydrocarbon exemplar group members, a second interface for calculating hydrocarbon exemplar data group probability density function values and non-hydrocarbon exemplar data group probability density function values over an attribute space based on selected distribution values of seismic data attributes of the hydrocarbon exemplar group members and non-hydrocarbon exemplar group members and a third interface for applying a Bayesian inversion to determine exemplar data group membership probability for seismic data associated with at least one of the plurality of seismic data sensor locations by distribution values of the seismic attribute values of the seismic data associated with at least one of the plurality of seismic data sensor locations to at least one of the calculated hydrocarbon exemplar data group probability density function values and non-hydrocarbon exemplar data group probability density function values.

In another aspect the set of application program interfaces comprises a parametric-model interface for receiving data to calculate parametric models from selected distribution values of hydrocarbon exemplar group members and non-hydrocarbon exemplar group members. In still another aspect the set of application program interfaces includes a hydrocarbon-indication interface that receives data classifying the seismic sensor attribute data as one selected from the list consisting of i) no-hydrocarbon or ii) hydrocarbon. In yet another aspect the set of application program interfaces includes a seismic-sensor-processing interface that receives instructions for processing seismic sensor data that is at least one selected from the group consisting of i) particle velocity values, ii) particle acceleration values, iii) particle pressure values and iv) particle displacement values.

The set of application program interfaces may include a display interface that receives instructions for displaying the exemplar data group membership probability for seismic data associated with at least one of the plurality of seismic data sensor locations. In another aspect the set of application program interfaces includes an attribute-calculating interface that receives instructions for processing the attribute values of the seismic data. Another aspect includes a distribution-values interface that receives data classifying the seismic attributes as derived from at least one selected from the list consisting of i) mean, ii) mode, iii) median, iv) standard deviation and v) stability. Yet another aspect includes an attribute-derivation interface that receives instructions for processing seismic data attributes of the hydrocarbon exemplar group members are statistical distribution values derived from at least one selected from the group consisting of: i) spectral density value, ii) ratio of vertical particle motion component to horizontal particle motion component, iii) vertical particle motion and iv) seismic data polarization value. Another aspect includes a display interface that receives instructions for displaying the exemplar data group membership probability for seismic data associated with at least one of the plurality of seismic data sensor locations.

In still another nonlimiting embodiment an information handling system for determining the presence of subsurface hydrocarbons associated with an area of seismic data acquisition includes a processor configured for selecting a hydrocarbon associated exemplar data group and a non-hydrocarbon associated exemplar data group from seismic data associated with a plurality of data sensor locations to obtain hydrocarbon exemplar group members and non-hydrocarbon exemplar group members, further configured for calculating hydrocarbon exemplar data group probability density function values and non-hydrocarbon exemplar data group probability density function values over an attribute space based on selected distribution values of seismic data attributes of the hydrocarbon exemplar group members and non-hydrocarbon exemplar group members, further configured for applying a Bayesian inversion to determine exemplar data group membership probability for seismic data associated with at least one of the plurality of seismic data sensor locations by comparing the attribute values of the seismic data to at least one the calculated hydrocarbon exemplar data group probability density function values and non-hydrocarbon exemplar data group probability density function values and includes a computer readable medium for storing at least one of the calculated hydrocarbon exemplar data group probability density function values and non-hydrocarbon exemplar data group probability density function values.

In another aspect the processor of the information handling system is configured to calculate parametric models from selected distribution values of hydrocarbon exemplar group members and non-hydrocarbon exemplar group members. In another aspect the processor of the information handling system is configured for classifying the seismic sensor attribute data as one selected from the list consisting of i) no-hydrocarbon or ii) hydrocarbon. In another aspect the information handling system includes a display device for displaying the exemplar data group membership probability for seismic data associated with at least one of the plurality of seismic data sensor locations. In still another aspect, selected reservoir properties may be inverted for by using the information handling system, which properties are at least one selected from the group consisting of: i) porosity, ii) permeability, iii) net pay thickness, iv) fluid saturations. The seismic data, representing particle motion, in the information handling system is at least one selected from the group consisting of i) particle velocity values, ii) particle acceleration values and iii) particle pressure values. The information handling system may also include a graphical display coupled to the processor and configured to present a view of the exemplar data group membership probability for seismic data associated with at least one of the plurality of seismic data sensor locations by contouring the group membership probability over an area associated with the seismic data sensor locations. In another aspect of the information handling system the distribution values of the seismic attributes are selected from the group consisting of i) mean, ii) mode, iii) median, iv) standard deviation and v) stability. The processor of the information handling system, in yet another aspect, may be configured to determine statistical distribution values derived from seismic data attributes that are at least one selected from the group consisting of i) spectral density value, ii) ratio of vertical particle motion component to horizontal particle motion component, iii) vertical particle motion and iv) seismic data polarization value.

Figure 9:
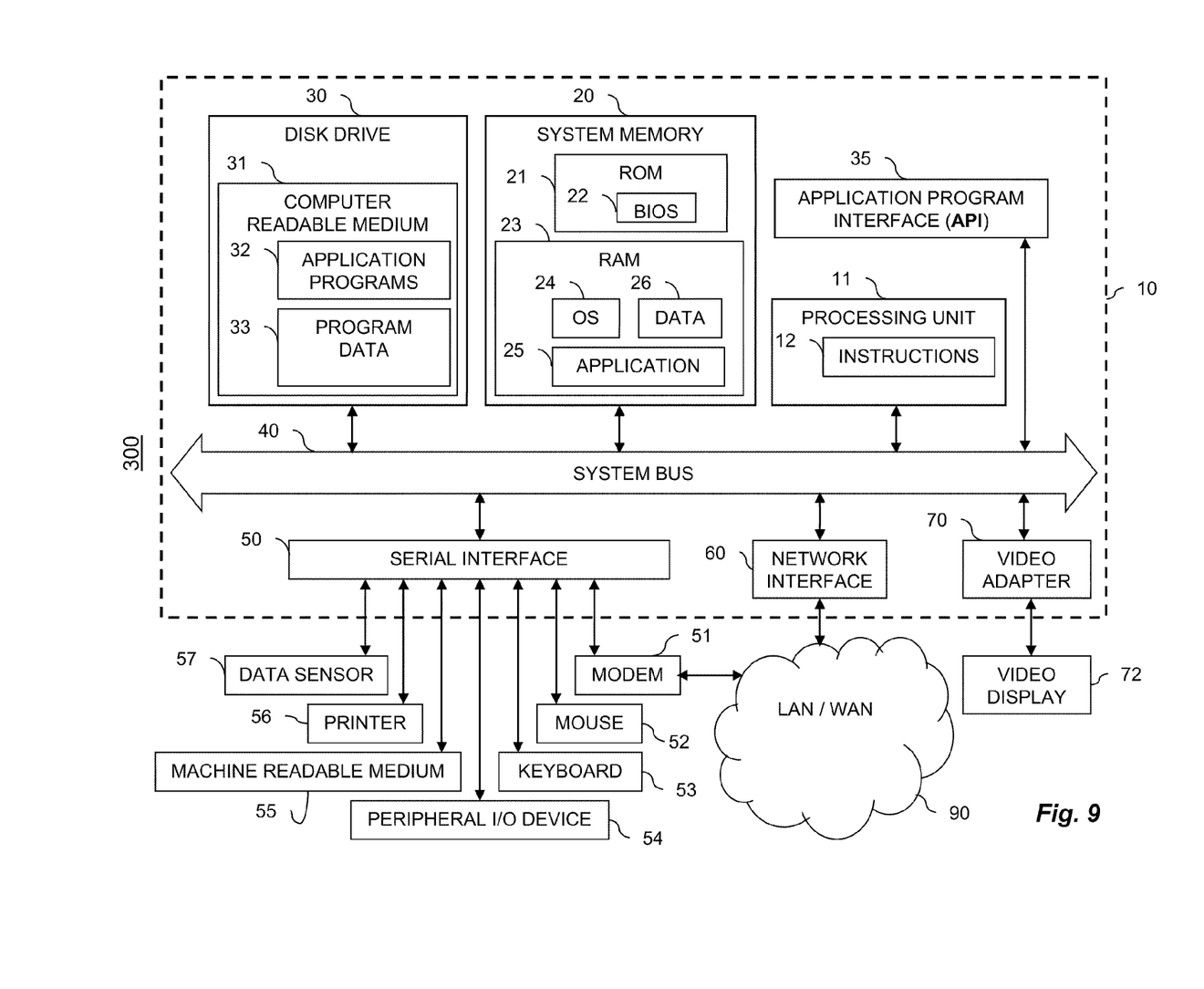
FIG. 9 is diagrammatic representation of a machine in the form of a computer system within which a set of instructions, when executed may cause the machine to perform any one or more of the methods and processes described herein.

FIG. 9 illustrates a schematic example of the hardware and operating environment 300 for which embodiments as described herein and their equivalents may be practiced. The description of FIG. 9 includes a general description of computer hardware, computing environment or information handling system for which the embodiments may be implemented. Although specific hardware may not be required, embodiments may be implemented in the general context of computer-executable instructions, such as program modules, being executed by a computer. Various embodiments may be practiced with a personal computer, a mainframe computer or combinations that include workstations with servers. Program modules include routines, programs, objects, components and data structures for performing tasks, processing data, and recording and displaying information.

The products as defined herein may be particularly adapted for use in what are termed an "information handling system." An information handling system is any instrumentality or aggregate of instrumentalities primarily designed to compute, classify, process, transmit, receive, retrieve, originate, switch, store, display, manifest, measure, detect, record, reproduce, handle or utilize any form of information, intelligence or data for business, scientific, control or other purposes. Examples include personal computers and larger processors such as servers, mainframes, etc, and may contain elements illustrated in FIG. 9.

Embodiments may be practiced with various computer or information handling system configurations that separately or in combination may include hand-held devices, multiprocessor systems, microprocessor-based or programmable consumer electronics, network computers, minicomputers, mainframe computers, and the like. Embodiments may be practiced with tasks performed in and over distributed computing environments that include remote processing devices linked through a communications network. Program modules operating in distributed computing environments may be located in various memory locations, both local and remote.

FIG. 9 is illustrative of hardware and an operating environment for implementing a general purpose computing device or information handling system in the form of a computer 10. Computer 10 includes a processor or processing unit 11 that may include 'onboard' instructions 12. Computer 10 has a system memory 20 attached to a system bus 40 that operatively couples various system components including system memory 20 to processing unit 11. The system bus 40 may be any of several types of bus structures using any of a variety of bus architectures as are known in the art.

While one processing unit 11 is illustrated in FIG. 9, there may be a processing unit (CPU) or a graphics processing unit (GPU), or both or a plurality of processing units. Computer 10 may be a standalone computer, a distributed computer, or any other type of computer. Additionally, the steps illustrated in FIG. 6, FIG. 7 and FIG. 8 may be accomplished using a processing unit.

System memory 20 includes read only memory (ROM) 21 with a basic input/output system (BIOS) 22 containing the basic routines that help to transfer information between elements within the computer 10, such as during start-up. System memory 20 of computer 10 further includes random access memory (RAM) 23 that may include an operating system (OS) 24, an application program 25 and data 26.

Computer 10 may include a disk drive 30 to enable reading from and writing to an associated computer or machine readable medium 31. Computer readable media 31 includes application programs 32 and program data 33.

For example, computer readable medium 31 may include programs to process seismic data, which may be stored as program data 33, according to the methods disclosed herein. The application program 32 associated with the computer readable medium 31 includes at least one application interface for receiving and/or processing program data 33. The program data 33 may include seismic data acquired according to embodiments disclosed herein. At least one application interface may be associated with one or more aspects for calculating probability density functions for locating subsurface hydrocarbon reservoirs.

The disk drive may be a hard disk drive for a hard drive (e.g., magnetic disk) or a drive for a magnetic disk drive for reading from or writing to a removable magnetic media, or an optical disk drive for reading from or writing to a removable optical disk such as a CD ROM, DVD or other optical media.

Disk drive 30, whether a hard disk drive, magnetic disk drive or optical disk drive is connected to the system bus 40 by a disk drive interface (not shown). The drive 30 and associated computer-readable media 31 enable nonvolatile storage and retrieval for one or more application programs 32 and data 33 that include computer-readable instructions, data structures, program modules and other data for the computer 10. Any type of computer-readable media that can store data accessible by a computer, including but not limited to cassettes, flash memory, digital video disks in all formats, random access memories (RAMs), read only memories (ROMs), may be used in a computer 10 operating environment.

The application programs 32 may be associated with one or more application program interfaces. An application programming interface (API) 35 may be an interface that a computer system, library or application provides in order to allow requests for services to be made of it by other computer programs, and/or to allow data to be exchanged between them. An API 35 may also be a formalized set of software calls and routines that can be referenced by an application program 32 in order to access supporting application programs or services, which programs may be accessed over a network 90.

APIs 35 are provided that allow for higher level programming for displaying and mapping subsurface reservoirs. For example, APIs are provided for receiving seismic data, and decomposing, merging, smoothing and averaging the data, as well as determining exemplar data group membership probability values as disclosed herein. Moreover, the APIs allow for various outputs of the methods disclosed herein and storing them for display or further processing.

Data input and output devices may be connected to the processing unit 11 through a serial interface 50 that is coupled to the system bus. Serial interface 50 may a universal serial bus (USB). A user may enter commands or data into computer 10 through input devices connected to serial interface 50 such as a keyboard 53 and pointing device (mouse) 52. Other peripheral input/output devices 54 may include without limitation a microphone, joystick, game pad, satellite dish, scanner or fax, speakers, wireless transducer, etc. Other interfaces (not shown) that may be connected to bus 40 to enable input/output to computer 10 include a parallel port or a game port. Computers often include other peripheral input/output devices 54 that may be connected with serial interface 50 such as a machine readable media 55 (e.g., a memory stick), a printer 56 and a data sensor 57. A seismic sensor or seismometer for practicing embodiments disclosed herein are nonlimiting examples of data sensor 57. A video display 72 (e.g., a liquid crystal display (LCD), a flat panel, a solid state display, or a cathode ray tube (CRT)) or other type of output display device may also be connected to the system bus 40 via an interface, such as a video adapter 70. A map display created from exemplar data group membership probability values as disclosed herein may be displayed with video display 72.

A computer 10 may operate in a networked environment using logical connections to one or more remote computers. These logical connections are achieved by a communication device associated with computer 10. A remote computer may be another computer, a server, a router, a network computer, a workstation, a client, a peer device or other common network node, and typically includes many or all of the elements described relative to computer 10. The logical connections depicted in FIG. 9 include a local-area network (LAN) or a wide-area network (WAN) 90. However, the designation of such networking environments, whether LAN or WAN, is often arbitrary as the functionalities may be substantially similar. These networks are common in offices, enterprise-wide computer networks, intranets and the Internet.

When used in a networking environment, the computer 10 may be connected to a network 90 through a network interface or adapter 60. Alternatively computer 10 may include a modem 51 or any other type of communications device for establishing communications over the network 90, such as the Internet. Modem 51, which may be internal or external, may be connected to the system bus 40 via the serial interface 50.

In a networked deployment computer 10 may operate in the capacity of a server or a client user machine in server-client user network environment, or as a peer machine in a peer-to-peer (or distributed) network environment. In a networked environment, program modules associated with computer 10, or portions thereof, may be stored in a remote memory storage device. The network connections schematically illustrated are for example only and other communications devices for establishing a communications link between computers may be used.

While various embodiments have been shown and described, various modifications and substitutions may be made thereto without departing from the spirit and scope of the disclosure herein. Accordingly, it is to be understood that the present embodiments have been described by way of illustration and not limitation.

We claim:

1. A set of application program interfaces embodied on a computer readable medium for execution on a processor in conjunction with an application program for determining a direct hydrocarbon indicator from seismic data comprising: a first interface for receiving a hydrocarbon associated exemplar data group and a non-hydrocarbon associated exemplar data group from seismic data associated with a plurality of data sensor locations to obtain hydrocarbon exemplar group members and non-hydrocarbon exemplar group members, a second interface for calculating hydrocarbon exemplar data group probability density function values and non-hydrocarbon exemplar data group probability density function values over an attribute space based on selected distribution values of seismic data attributes of the hydrocarbon exemplar group members and non-hydrocarbon exemplar group members and a third interface for applying a Bayesian inversion to determine exemplar data group membership probability for seismic data associated with at least one of the plurality of seismic data sensor locations by distribution values of the seismic attribute values of the seismic data associated with at least one of the plurality of seismic data sensor locations to at least one of the calculated hydrocarbon exemplar data group probability density function values and non-hydrocarbon exemplar data group probability density function values.

2. The set of application program interfaces according to claim 1 further comprising: a parametric-model interface for receiving data to calculate parametric models from selected distribution values of hydrocarbon exemplar group members and non-hydrocarbon exemplar group members.

3. The set of application program interfaces according to claim 1 further comprising: a distribution-values interface that receives data classifying the seismic attributes as derived from at least one selected from the list consisting of i) mean, ii) mode, iii) median, iv) standard deviation and v) stability.

4. The set of application program interfaces according to claim 1 further comprising: an attribute-derivation interface that receives instructions for processing seismic data attributes of the hydrocarbon exemplar group members are statistical distribution values derived from at least one selected from the group consisting of: i) spectral density value, ii) ratio of vertical particle motion component to horizontal particle motion component, iii) vertical particle motion and iv) seismic data polarization value.

5. The set of application program interfaces according to claim 1 further comprising: a display interface that receives instructions for displaying the exemplar data group membership probability for seismic data associated with at least one of the plurality of seismic data sensor locations.

6. The set of application program interfaces according to claim 1 further comprising: a seismic-sensor-processing interface that receives instructions for processing seismic sensor data that are at least one selected from the group consisting of i) particle velocity values, ii) particle acceleration values, iii) particle pressure values and iv) particle displacement values.

7. An information handling system for determining the presence of subsurface hydrocarbons associated with an area of seismic data acquisition comprising: a processor configured for selecting a hydrocarbon associated exemplar data group and a non-hydrocarbon associated exemplar data group from seismic data associated with a plurality of data sensor locations to obtain hydrocarbon exemplar group members and non-hydrocarbon exemplar group members; further configured for calculating hydrocarbon exemplar data group probability density function values and non-hydrocarbon exemplar data group probability density function values over an attribute space based on selected distribution values of seismic data attributes of the hydrocarbon exemplar group members and non-hydrocarbon exemplar group members; further configured for applying a Bayesian inversion to determine exemplar data group membership probability for seismic data associated with at least one of the plurality of seismic data sensor locations by comparing the attribute values of the seismic data to at least one the calculated hydrocarbon exemplar data group probability density function values and non-hydrocarbon exemplar data group probability density function values; and a computer readable medium for storing at least one of the calculated hydrocarbon exemplar data group probability density function values and non-hydrocarbon exemplar data group probability density function values.

8. The information handling system of claim 7 wherein the processor is configured to calculate parametric models from selected distribution values of hydrocarbon exemplar group members and non-hydrocarbon exemplar group members.

9. The information handling system of claim 7 further comprising a display device for displaying the exemplar data group membership probability for seismic data associated with at least one of the plurality of seismic data sensor locations.

10. The information handling system of claim 7 wherein the distribution values of the seismic attributes are selected from the group consisting of i) mean, ii) mode, iii) median, iv) standard deviation and v) stability.

11. The information handling system of claim 7 wherein the processor is configured to determine statistical distribution values derived from seismic data attributes that are at least one selected from the group consisting of i) spectral density value, ii) ratio of vertical particle motion component to horizontal particle motion component, iii) vertical particle motion and iv) seismic data polarization value.

12. The information handling system of claim 7 wherein seismic data associated with a plurality of data sensor locations are at least one selected from the group consisting of i) particle velocity values, ii) particle acceleration values and iii) particle pressure values.

13. The information handling system of claim 7 further comprising: a graphical display coupled to the processor and configured to present a view of the exemplar data group membership probability for seismic data associated with at least one of the plurality of seismic data sensor locations by contouring the group membership probability over an area associated with the seismic data sensor locations.

* * * * *